3,564,776
OPTICAL SURFACE GENERATING METHOD AND APPARATUS
Ronald Aspden, Bedford, Mass., assignor to Itek Corporation, Lexington, Mass., a corporation of Delaware
Filed Apr. 16, 1969, Ser. No. 816,683
Int. Cl. B24b 1/00, 7/00
U.S. Cl. 51—55
26 Claims

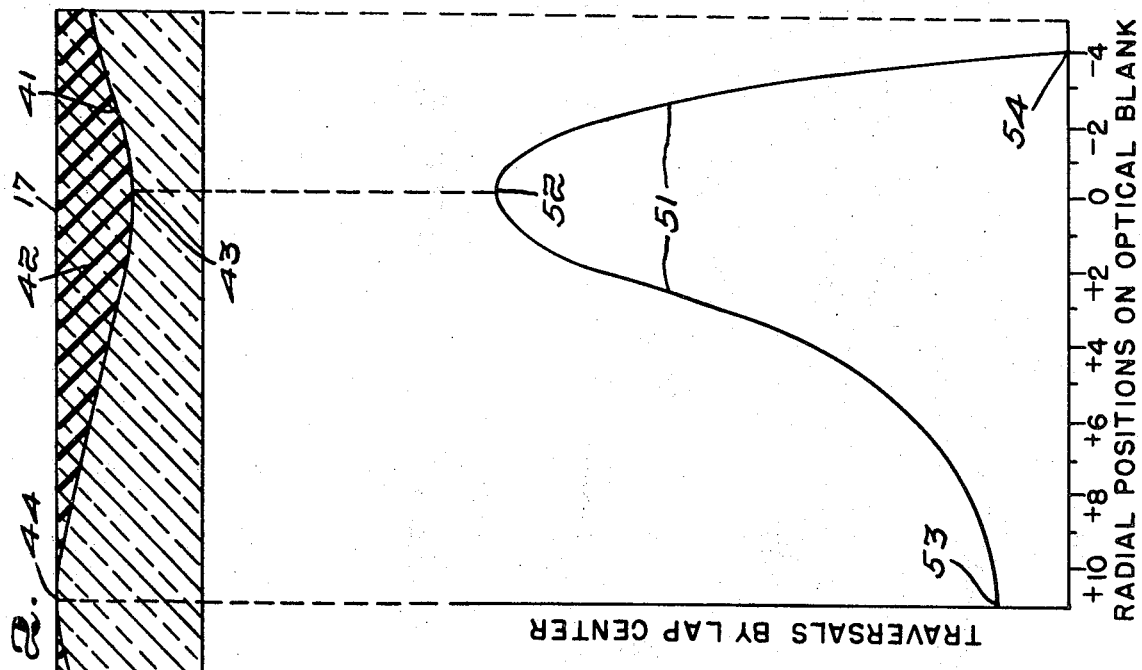
Fig. 2.
Fig. 3.
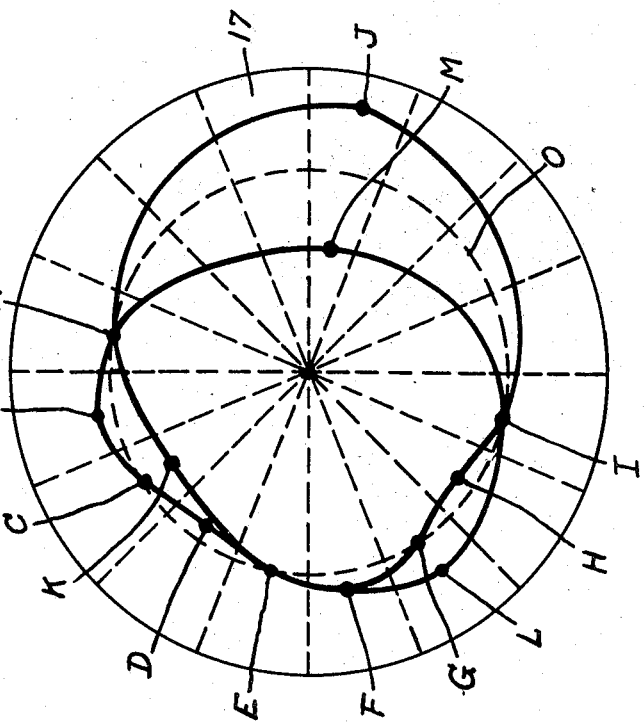
Fig. 4.
Inventor:
Ronald Aspden,
by John E. Toupal
Attorney United States Patent Office 3,564,776
Patented Feb. 23, 1971

ABSTRACT OF THE DISCLOSURE

A surface modifying method wherein an optical lap is moved over the work surface of an optical blank in a path having a circumferential component and an oscillating radial component controlled so as to change directions when the lap is adjacent predetermined positions on the blank's work surface. Control of the radial components direction reversals with respect to both the blank's radius and circumference permits generation of completely symmetrical surface changes.

BACKGROUND OF THE INVENTION

This invention relates generally to a method and apparatus for generating optical surfaces. More particularly, the invention relates to a method and apparatus especially suited for generating radially symmetric optical surfaces.

Radially symmetric optical surfaces are most commonly generated with machines that produce relative movement between an optical lap and the work surface of a suitable optical blank. The relative movement normally comprises both circumferential and radial components such that the lap periodically passes over all areas on the work surface. In a typical machine, the circumferential component is produced by rotating the optical blank and the radial component is produced by reciprocation of the lap. The particular repetitive path followed by the lap on the work surface is established by manual adjustment of the machine and during a typical polishing operation, a technician will periodically readjust the machine so as to alter the path of relative movement. These periodic modifications in the paths of relative movement are made in attempts to produce a desired surface contour and are made according to completely empirically developed techniques.

The generation of radially symmetric surfaces with machines of this type suffers from a number of disadvantages including the requirement for highly skilled technicians, lengthy processing periods, and insufficient degrees of reliability and precision. Many of these difficulties are alleviated by a greatly improved optical device disclosed in the applicant's co-pending U.S. application Ser. No. 724,082 filed May 25, 1968 and entitled "Optical Surface Generating Method and Apparatus." The machine therein described includes an automatic control mechanism that permits continuous and selective variation in the amplitude of the reciprocating lap motion. According to the surface generation method disclosed, an analysis is first made of an optical blank to determine the relative number of lap center traversals that are required along radially spaced positions on the blank's work surface to produce the desired surface contour. The information obtained is used to program a control mechanism which then randomly varies the amplitude of the reciprocating lap so as to generate the required lap traversal relationship. Although the specific embodiment disclosed in that application utilizes cam surfaces as controlling devices, other well known control mechanisms including other well known mechanical guides and sensors, magnetic tapes and readers, electrical digital counters, electrical timers, digital or analog computers are suggested as suitable alternatives.

The above noted surface generating machine generally is quite effective for producing radially symmetric optical surfaces but can under certain circumstances or required tolerances introduce surface errors. Since no correlation between the circumferential and radial components of relative movement is made, the law of averages are relied upon to insure that the extremely large number of individual radial lap movements produced will be evenly distributed circumferentially about the blank's work surface. Consequently, a fortuitous non-uniform circumferential distribution of the individual amplitudes is possible in which case surface asymmetries will be generated.

The object of this invention, therefore, is to provide a relatively simple optical surface generating machine of the above described type but which prevents the fortuitous generation of surface asymmetries.

CHARACTERIZATION OF THE INVENTION

According to a preferred method embodiment of the invention, an optical lap is moved transversely over the centrally curved surface of an optical blank in a path having both circumferential and oscillating radial components. The amplitude of the oscillating radial component is continuously varied so as to generate on the work surface a desired contour change. In addition, the varying amplitudes of the radial component are selected so as to produce direction reversals thereof when the lap is sequentially adjacent different predetermined sectors of the work surface. By correlating radial component direction reversals with the relative circumferential position existing between the lap and work surface at the time of the reversals, one is able to control the circumferential distribution of surface change produced on the work surface by the reciprocating lap.

An important feature of the invention is a provision of a surface generating method of the above type wherein the work surface is figuratively divided into a given number of sectors and the varying amplitudes produce a predetermined relative number of the lap movement direction reversals adjacent each of a given number of radial positions on the work surface. By equalizing the number of direction reversals that occur in each sector adjacent each of the given number of radial positions, one insures that only symmetrical surface changes will be produced on the work surface.

Another feature of the invention is the provision of a surface generating method of the above type wherein the circumferential component of relative movement is produced by rotating the optical blank and the radial component is produced by reciprocating the optical lap. Blank rotation and lap reciprocation simplify the mechanical requirements for producing the desired relative motion.

The invention is characterized further by the provision of a surface generating machine uniquely suited for the practice of the above described methods. The machine includes drive mechanisms for rotating a centrally curved optical blank and reciprocating an optical lap, and an encoder for measuring the radial position of the lap with respect to the optical blank. A tape reader controls oscillating movement of the lap so as to produce direction reversals thereof adjacent predetermined radial positions on the blank's work surface as determined by the encoder. The predetermined radial positions are selected so as to also produce the reversals adjacent predetermined sectors of the rotating work surface.

Another important feature of the invention is the provision of an optical surface generating machine of the above type including a speed regulation system for maintaining a known relationship between the rotational speed of the work surface and the linear velocity of the lap. The existence of the known relationship between the circumferential and radial components of relative movement permits accurate selection of oscillating lap amplitudes that will produce direction reversals adjacent particular sectors of the rotating work surface.

Another feature of the invention is the provision of an optical surface generating machine of the above type wherein the speed regulation system includes a position indicator that measures rotational movement of the work surface and a comparator that compares the actual relative position of the work surface with respect to the lap with a relative position therebetween predicted by the tape reader. Position differences sensed by the comparator are used to alter the rotational speed of the optical blank and thereby maintain the desired speed relationship between the two components of relative movement.

BRIEF DESCRIPTION OF THE DRAWINGS

These and other features and objects of the present invention will become more apparent upon a perusal of the following specification taken in conjunction with the accompanying drawings wherein:

FIG. 2 is a cross-sectional view of an optical blank illustrating a desired surface change;

FIG. 3 is a diagram plotting optical blank radius vs. lap center traversals required to generate the surface contour shown in FIG. 2;

FIG. 4 is a schematic diagram illustrating the path of an optical lap moving across the surface of an optical blank figuratively divided into equal sized sectors;

DESCRIPTION OF THE PREFERRED EMBODIMENT

Figure 1:
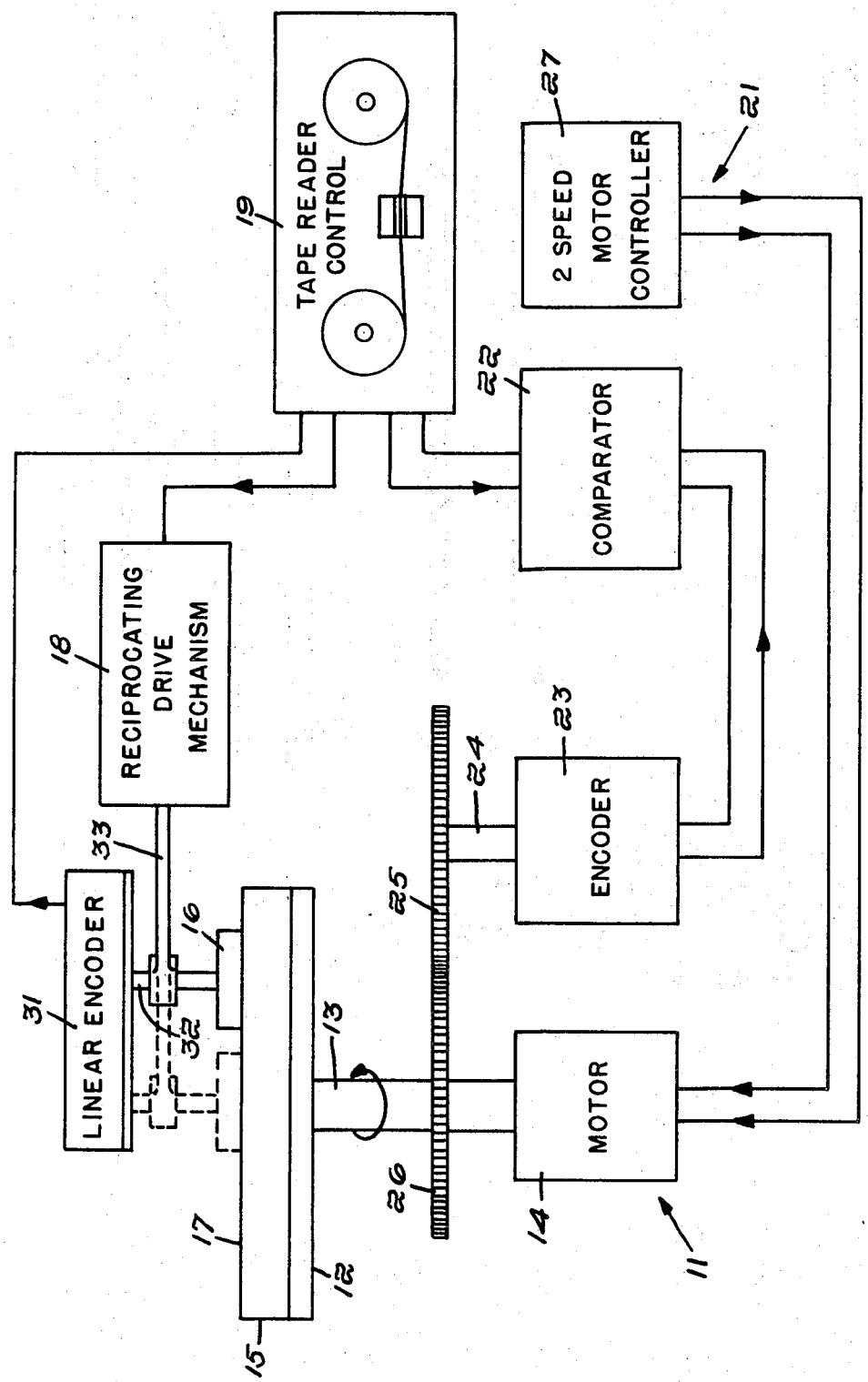
FIG. 1 is a schematic view of a preferred surface generating apparatus embodiment of the invention.

Referring to FIG. 1 there is shown schematically the optical surface generating machine 11 including the circular table 12 mounted on the shaft 13. Rotation of the shaft 13 and table 12 is produced by the electrical motor 14. The circular optical blank 15 is supported by and rotated with the table 12.

The optical lap 16 is supported by the circular work surface 17 of the optical blank 15. Reciprocating radial movement of the lap 16 between the center and periphery of the work surface 17 is produced by the drive mechanism 18. A suitable mechanism for producing the desired lap movement is disclosed in the above noted U.S. application Ser. No. 724,082. The drive mechanism 18 continuously varies the amplitude of the reciprocating lap's movement in accordance with information provided by the tape reader control 19.

The speed regulation system 21 includes the comparator 22 that receives position indicating signals from the encoder 23. Driving the shaft 24 of the encoder 23 is the spur gear 25 that meshes with mating spur gear 26 keyed for rotation with the motor drive shaft 13. The comparator 22 also receives position indicating signals from the tape reader control 19. Responsive to the position information received from the tape reader 19 and from the encoder 23 the comparator 22 produces output signals that regulate the two speed motor controller 27. The drive motor 14 alternates between two slightly different speeds under the control of motor controller 27 in response to the output of the comparator 22.

During operation of the machine 11 there is produced between the lap 16 and the work surface 17 a path of relative movement that includes both a circumferential component resulting from rotation of the blank 15 and a radial component resulting from the reciprocating movement of the lap 16. This path is established by varying the amplitude of the lap's reciprocal movement and is selected so as to produce a desired contour change on the work surface 17. The desired amplitude variations are produced by reversing the direction of the lap's linear movement when the lap's center is adjacent predetermined radial positions on the work surface 17.

In a preferred embodiment, the tape reader 19 possesses a magnetic tape that retains indicia representing the sequential radial positions at which direction reversals are desired. Also received by the tape reader 19 from the conventional linear encoder 31 are signals indicating the actual radial position of the lap 16 with respect to the work surface 17. The encoder 31 is driven by an arm 32 mounted on the reciprocating shaft 33 directly over the center of the lap 16. Thus, in operation the drive mechanism 18 moves the lap 16 in one direction until the encoder 31 indicates to the tape reader 19 that a radial position objective has been reached. Responsive to that information the tape reader 19 effects a reversal of the drive mechanism 18 which then moves the lap 16 in the opposite direction until the encoder 31 indicates that the next radial position objective has been reached. This lap direction reversal procedure continues until all objectives retained by the magnetic tape have been reached.

To describe the manner in which a particular contour change is produced by the apparatus shown in FIG. 1, reference is now made to FIGS. 2 and 3. Assume that one desires to produce a Schmidt plate from the circular blank 15 illustrated in diametrical crosss-ection in FIG. 2. The well known radially symmetric surface contour required for a Schmidt plate is diagrammatically represented by the contour line 41. Obviously, generation of the surface 41 requires removal from the blank 15 of a material volume represented in section by the shaded area 42. Since the volume of blank material to be removed is radially symmetric, one can analyze the material removal requirements by considering a radial section through that volume as illustrated, for example, by the right half of the area 42 in FIG. 2.

Referring to that area, it will be noted that a maximum depth of blank material must be removed along a concentric circle represented by the point 43 and that lesser material depths must be removed at the center 44 of the blank 15 and along its outer periphery 45. Thus, the lap 16 must polish an annular surface area centered on a pattern center circle represented by point 43 to a greater extent than areas located at the blank's center 44 or at its outer periphery 45. Furthermore, since the sense of the contour line 41 slope does not change between point 43 and the blank's center 44, annular concentric work surface areas between these boundaries each require a different depth of blank material removal with depths increasing in the radial direction between the blank's center 44 and the pattern center represented by point 43. Similarly, decreasing depths of blank material must be removed from the radially spaced, annular surface areas between the pattern center represented by point 43 and the outer periphery 45.

According to the present invention, the various blank material removal depths required for generation of the surface contour 41 are developed by controlling precisely the relative time spent by the lap 16 in radially spaced, circular concentric areas on the work surface 17. The desired relationship is created as described above by continuously varying in a predetermined manner the amplitude of the lap's 16 radial oscillations. This varying amplitude is established so as to accurately control the relative number of times that the center of the lap 16 traverses various radial positions on the work surface 17.

The relationship between lap center traversals and optical blank radius is shown by curve 51 in FIG. 3. Lap center traversals are plotted along the ordinate axis and radial positions on the optical blank are plotted along the abscissa axis. The plotted curve 51 is aligned vertically with the cross-section of the optical blank 15 shown in FIG. 2 so as to facilitate a comparison of the factors represented in these figures. Thus, it will be noted that point 43 in FIG. 2 indicating the blank radius requiring the greatest depth of material removal is vertically aligned with the curve's 51 vertex 52 that represents the radial position on the optical blank to be most frequently traversed by the lap center. This position is given a zero designation. As would be expected, the curve 51 slopes downward on both sides of the vertex 52 terminating at the low points 53 and 54. The low point 53 represents the center 44 of the optical blank which as noted above required a minimum depth of blank material removal inside the radius 43 and low point 54 represents a blank radius closely adjacent its outer periphery 45. As shown, radial positions inside the pattern center line 43 are given positive designations and positions outside are given negative designations. It should be noted again here that the ordinate in FIG. 3 plots traversals by the lap center and not the lap edge. Thus, the termination of curve 51 at point 54 corresponding to a blank radius less than maximum does not imply that an outer marginal portion of the blank remains untouched by the surface of the lap 16. For example, the lap 16 may have a diameter equal to one half the radius of the work surface 17.

A mathematical analysis of the curve 51 with respect to the required blank material removal depths illustrated in FIG. 2 is extremely complex because of the numerous variables involved. Examples of these variables include material properties of the particular lap and blank utilized, the rotational speeds of both the blank and the lap, the relative sizes of the lap and blank, the radial translation speed of the oscillating lap, the pressure exerted between the surfaces of the lap and blank, etc. Because of these many variables, trial and error techniques are preferred fo restablishing the lap center traversal versus blank radius relationship that is appropriate for a particular surface contour. However, once determined the relationship remains constant provided that the above noted polishing variables are uniformly maintained.

After derivation, the information illustrated diagrammatically by the curve 51 in FIG. 3 is recorded on a conventional magnetic tape and inserted into the tape reader control 19 which responds to the recorded information by producing appropriate reciprocating movement of the lap 16. As previously mentioned the lap control information is recorded preferably in terms of the radial positions on the work surface 17 at which lap movement direction reversals must occur to produce the required distribution of lap traversals. Thus, in a simplified hypothetical case the information represented by FIG. 3 would result in the lap direction reversal information tabulated in Table 1 below.

TABLE 1

| Inward lap movement | | Outward lap movement | |
|---|---|---|---|
| Radial position | Strokes | Sectors of movement | Radial position | Strokes |
| +1 | 144 | 1 | −1 | 272 |
| +2 | 128 | 2 | −2 | 224 |
| +3 | 96 | 3 | −3 | 160 |
| +4 | 80 | 4 | −4 | 48 |
| +5 | 64 | 5 | | |
| +6 | 48 | 6 | | |
| +7 | 48 | 7 | | |
| +8 | 32 | 8 | | |
| +9 | 32 | 9 | | |
| +10 | 16 | 10 | | |
| +11 | 16 | 11 | | |

As shown in Table 1, the distribution of lap traversals will be produced if the direction of lap movement changes from inward to outward 144 times at radial position +1, 128 times at radial position +2, 96 times at radial position +3, etc.; and changes from outward to inward 272 times at radial position −1, 224 times at radial position −2, etc. The lap direction reversal data tabulated above inherently includes the lap center traversal information plotted in FIG. 3. This is obvious when one considers that each lap reversal adjacent a given radial position on the work surface 17 entails one lap traversal of the given position and two lap traversals (one for each direction of lap movement) for each radial position between the given position and the pattern center position 0. For example, Table I indicates 16 lap traversals of position +11, 48 (16+16+16) traversals of radial position +10, 96 (16+16+16+16+32) traversals of radial position +9, 48 traversals of position −4, etc. It will be appreciated that the above table is simplified for reasons of explanation and that in practice a much larger number of reversal positions would be used. In practice, a complete surface generation program includes a large number of sub-programs each comprising a different group of reversal positions. These sub-programs are run sequentially and the contour of the work surface is analyzed after completion of each.

The lap movement direction reversals tabulated above produce between lap 16 and surface 17 an oscillating radial component of relative movement that satisfies the lap traversal plot in FIG. 3. However, we have also a circumferential component of relative movement that affects the annular distribution of the radial lap strokes that produce the radial component. And generation of a radially symmetric surface change requires that the radial stroke amplitude variations be distributed uniformly with respect to the circumference of the work surface 17. According to the disclosure in the above noted U.S. application Ser. No. 724,082, the radial stroke amplitudes are varied in a completely random manner and the law of averages are relied upon to establish the desired uniformity. Because of the extremely large number of lap traversals used to generate a typical optical surface this system is satisfactory in most cases. Nevertheless, upon the fortuitous occurrence of a non-uniform circumferential distribution of the variable reciprocating lap amplitudes, radial asymmetries can be generated on the work surface. The problem is particularly significant in applications wherein even extremely small surface errors are unacceptable.

The manner in which radial asymmetries can be produced will be explained by reference to FIG. 4 which schematically illustrates the path of the lap 16 over the optical blank's work surface 17 that has been figuratively divided into 16 equal sectors. Assuming a constant relationship between the linear speed of the lap 16 and the rotational speed of the work surface 17, a given stroke of radial lap movement will correspond to a given degree of rotational movement by the work surface 17. This relationship also is tabulated in Table I above under the heading Sectors of Movement. Thus, during inward movement of the lap 16 from the pattern center position 0 to radial position +1 the work surface 17 will rotate through an arcuate distance corresponding to one of the sectors illustrated in FIG. 4. Similarly, radial movement of the lap 16 between the center position 0 and radial position +2 corresponds to two sectors of work surface rotation, etc.

Referring again to FIG. 4 there is shown schematically the path followed by the lap 16 over the work surface 17 during a limited portion of the program tabulated in Table I. The path illustrated represents sequential lap strokes beginning at the pattern center 0 and terminating at radial positions −1, +1, −1, +1, −4, +2, −2, and +4. Since, as indicated in Table I, radial lap movement between positions 0 and −1 corresponds to one sector of work surface rotation the −1 position objective is reached at point B spaced one sector from starting point A. Furthermore, assuming that the relative speeds remain constant, the return of the lap to the pattern center line at point C also corresponds to one sector of rotational movement as shown. The next radial position objective is +1 and, as indicated in Table I this stroke also corresponds to one sector of rotational movement. Thus, the +1 objective position is reached at point D spaced one sector from the previously reached return point C. Again, return to the pattern center line is reached at point E corresponding to another signal sector of relative circumferential movement.

The lap travel path then proceeds radially outward to the next objective position −1 as indicated at point F, returns to the center line 0 at point G, moves inward to the next objective position +1 as indicated at point H and returns to the center line at point I. Each of these lap movements occurs in the stipulated one sector of relative circumferential movement between the lap 16 and the work surface 17. The next objective is outward radial position −4 and as tabulated above this stroke requires four sectors of circumferential movement. Thus, the −4 objective is reached at point J spaced four sectors from the previous return point I. Again, return of the lap to the pattern center line 0 requires four sectors of relative circumferential movement and is completed at the original starting position represented by point A. The next objective position +2 requires two sectors of rotational movement and is reached at point K in the diagram. Again, the return to the center line also requires two sectors of movement and is completed at previously designated point E. Two sectors movements also are required to reach the next objective position −2 represented by point L and in the return to the center line 0 at the previously designated point I. Finally, the above noted segment of the polishing operation is completed by movement of the lap 16 inward to radial objective +4 represented in the diagram by point M and return to the pattern center line 0 at original starting point A. Each of these final movements are accomplished in four sectors of circumferential movement which, as indicated in Table I, corresponds to the +4 radial stroke.

An examination of the diagram in FIG. 4 illustrates clearly the asymmetrical nature of the path generated. The portion of the work surface 17 represented by the left half of the diagram was polished by the lap in areas closely adjacent the pattern center line 0. Conversely, the portion of the work surface 17 represented by the right half of the diagram was polished at the inner and outer peripheries but not in the area immediately adjacent the pattern center line. The path illustrated in FIG. 4 is naturally but an extremely small portion of the entire polishing operation. Nevertheless, a fortuitous distribution of randomly selected stroke amplitudes can result similarly in an asymmetrical distribution of polishing operations although obviously not to the severe extent indicated in FIG. 4.

The surface generation method of the present invention greatly reduces the possibility of producing asymmetrical surface changes. According to this method, the optical blank's work surface first is divided figuratively into a number of equal sized sectors. Next, the movement of the lap over the work surface is controlled such that the number of radial lap strokes of each given amplitude that terminate in each sector of the work surface are equalized.

In this way absolute uniformity of circumferential stroke distribution is assured.

Figure 5:
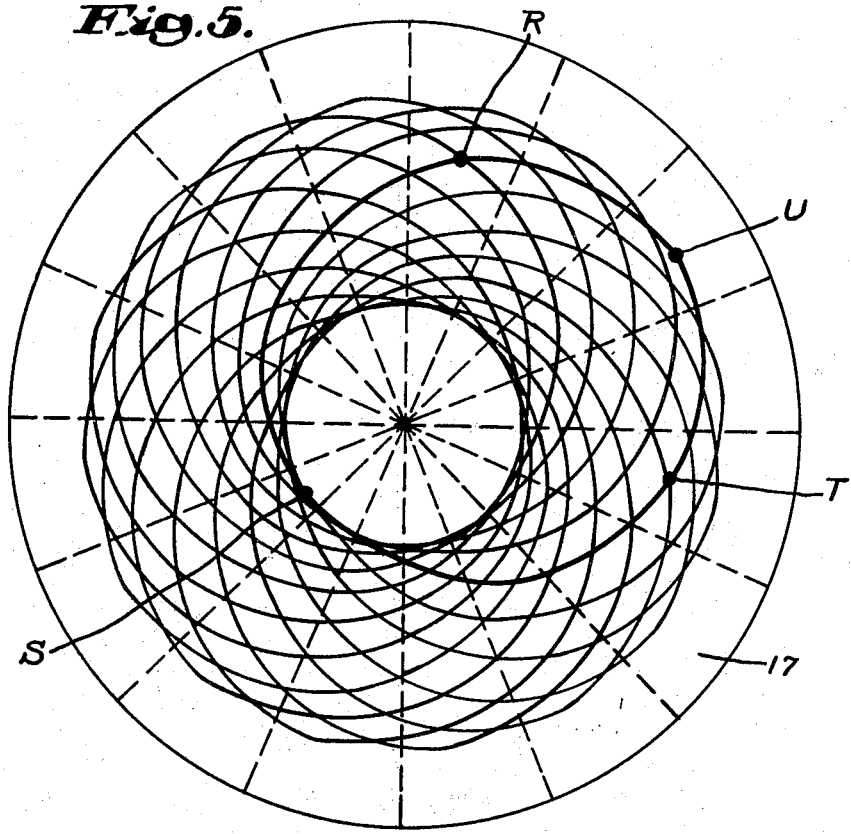
FIG. 5 is a schematic diagram illustrating a continuation of the path shown in FIG. 4.

To demonstrate this method reference is now made to FIG. 5 which diagrammatically illustrates a portion of a lap travel path generated according to the invention. The heavy lined portion of the path represents lap movements to objective positions +6 and −2. Beginning at point R this path portion moves through twelve sectors in reaching the +6 objective at point S and in returning to the pattern center line at point T. Next, the path moves through four sectors in reaching objective −2 at point U and in returning to the pattern center line at original starting point R. The remainder of the lap travel path is composed of fifteen path segments each identical to the described +6, −2 segment but each originating in a different sector of the work surface 17. With identical paths of lap movement beginning in each sector of the work surface, it will be obvious that the above described equalization of stroke terminations in each sector is accomplished. For example, the composite path illustrated in FIG. 5 entails a +6 and a −2 stroke determination in each of the 16 sectors. The absolute symmetry of the generated path is clearly evident. Although FIG. 5 diagrammatically illustrates only a small portion of a complete polishing operation, the application of the described method for an entire program will result similarly in the generation of a completely symmetrical lap travel path.

The repetition of a given path segment originating from different sectors as shown in FIG. 5 is used to simplify an explanation of the invention. However, in the interest of high quality surface generation it is preferred that the invention be carried out with random stroke amplitude combinations rather than with repetitive cycles. Thus, in a preferred method embodiment, a suitably programmed computer utilizes information regarding the number of various radial stroke amplitudes necessary to generate a desired surface contour and the relative rotational and linear speeds of, respectively, the work piece 15 and the lap 16 to produce a random set of sequential radial objectives that will provide the required stroke amplitudes and will be uniformly distributed around the work surface 17.

To further explain the practice of the invention, we will consider again the surface polishing program represented above in Table I. Assuming that the work surface 17 again is divided into 16 equal sized sectors, Table 2 below tabulates the number of strokes of each amplitude that must terminate in each sector of the work surface to establish both the total number of required strokes and the desired uniformity of their circumferential distribution.

TABLE 2

| | Inward stroke terminations | | | | | | | | | | | Outward stroke terminations | | | |
|---|---|---|---|---|---|---|---|---|---|---|---|---|---|---|---|
| | +1 | +2 | +3 | +4 | +5 | +6 | +7 | +8 | +9 | +10 | +11 | −1 | −2 | −3 | −4 |
| Sector No.: | | | | | | | | | | | | | | | |
| I | 9 | 8 | 6 | 5 | 4 | 3 | 3 | 2 | 2 | 1 | 1 | 17 | 14 | 10 | 3 |
| II | 9 | 8 | 6 | 5 | 4 | 3 | 3 | 2 | 2 | 1 | 1 | 17 | 14 | 10 | 3 |
| III | 9 | 8 | 6 | 5 | 4 | 3 | 3 | 2 | 2 | 1 | 1 | 17 | 14 | 10 | 3 |
| IV | 9 | 8 | 6 | 5 | 4 | 3 | 3 | 2 | 2 | 1 | 1 | 17 | 14 | 10 | 3 |
| V | 9 | 8 | 6 | 5 | 4 | 3 | 3 | 2 | 2 | 1 | 1 | 17 | 14 | 10 | 3 |
| VI | 9 | 8 | 6 | 5 | 4 | 3 | 3 | 2 | 2 | 1 | 1 | 17 | 14 | 10 | 3 |
| VII | 9 | 8 | 6 | 5 | 4 | 3 | 3 | 2 | 2 | 1 | 1 | 17 | 14 | 10 | 3 |
| VIII | 9 | 8 | 6 | 5 | 4 | 3 | 3 | 2 | 2 | 1 | 1 | 17 | 14 | 10 | 3 |
| IX | 9 | 8 | 6 | 5 | 4 | 3 | 3 | 2 | 2 | 1 | 1 | 17 | 14 | 10 | 3 |
| X | 9 | 8 | 6 | 5 | 4 | 3 | 3 | 2 | 2 | 1 | 1 | 17 | 14 | 10 | 3 |
| XI | 9 | 8 | 6 | 5 | 4 | 3 | 3 | 2 | 2 | 1 | 1 | 17 | 14 | 10 | 3 |
| XII | 9 | 8 | 6 | 5 | 4 | 3 | 3 | 2 | 2 | 1 | 1 | 17 | 14 | 10 | 3 |
| XIII | 9 | 8 | 6 | 5 | 4 | 3 | 3 | 2 | 2 | 1 | 1 | 17 | 14 | 10 | 3 |
| XIV | 9 | 8 | 6 | 5 | 4 | 3 | 3 | 2 | 2 | 1 | 1 | 17 | 14 | 10 | 3 |
| XV | 9 | 8 | 6 | 5 | 4 | 3 | 3 | 2 | 2 | 1 | 1 | 17 | 14 | 10 | 3 |
| XVI | 9 | 8 | 6 | 5 | 4 | 3 | 3 | 2 | 2 | 1 | 1 | 17 | 14 | 10 | 3 |

Obviously, the numbers of stroke terminations listed in Table 2 merely correspond to the total numbers of strokes in Table I divided by the number of sectors. Thus, generation of a uniformly distributed polishing pattern requires that one inward lap stroke of amplitude +10 terminates in each sector, 3 inward strokes of amplitude +7 terminate in each sector, 6 inward strokes of amplitude +3 terminate in each sector, etc.

Figure 6:
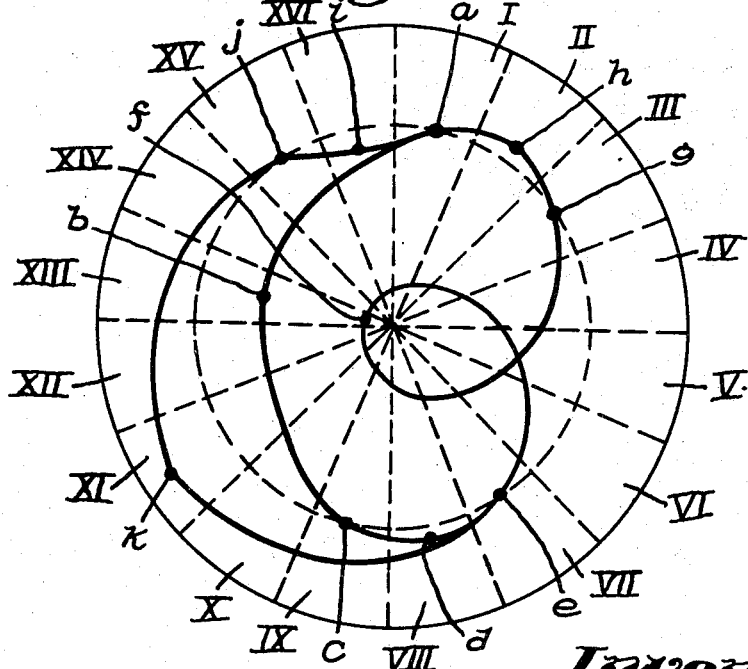
FIG. 6 is a schematic diagram illustrating another path of lap movement across a blank's work surface.

The manner in which the information in Table 2 is used to provide a lap control program with a circumferentially symmeric distribution of stroke amplitudes will be described in connection with FIG. 6. Illustrated schematically in FIG. 6 is a hypothetical path of lap movement corresponding to such a program. Assume that the lap center will be originally at the position indicated by point $a$ in sector I and that the same speed relationship will exist between lap and blank as that used to tabulate sector movements in Table I. The computer arbitrarily selects for initial movement a stroke amplitude of +1 that would terminate at point $b$ in sector XIII and return to the pattern center line at point $c$ in sector IX. Next selected is a −1 amplitude that would terminate at point $d$ in sector VIII and return to the pattern center at point $c$ in sector VII, a +10 amplitude that would terminate at point $f$ in sector XIII and return to the pattern center at point $g$ in sector III, a −1 amplitude that would terminate at point $h$ in sector II and return to pattern center at starting point $a$, a +1 stroke that would terminate at point $i$ in sector XVI and return to pattern center at point $j$ in sector XV, a −4 stroke that would terminate at point $k$ in sector XI and return to pattern center at previously designated point $e$. After each stroke amplitude selection, the computer's memory banks are modified to indicate the reduction in stroke amplitudes remaining in the program. For example, after selection of the strokes represented by the path schematically illustrated in FIG. 6, the strokes remaining for termination in each sector of the work surface are as indicated by Table 3 below.

restricted selection of stroke amplitudes continues until either all available combinations indicated by Table 2 have been chosen or no further choice is possible within a limited selection remaining.

Obviously, effective use of the polishing program provided by the computer requires that each radial stroke of the lap terminates in the predicted sector. This will not occur if the relationship between the rotational speed of the blank 15 and the linear speed of the lap 16 is different than that used by the computer in deriving the program. Thus, accurate control of the relative speeds is highly desirable. According to the invention, this control is provided in a simple manner by the speed regulation system 21 as described below.

In addition to sequential radial position objective data, the tape for the tape reader 19 is provided with information indicating the work surface sector in which each stroke should terminate. This latter information is supplied by the tape reader 19 to the comparator 22. Also received by the comparator 22 from the encoder 23 is coded information representing the work surface sector adjacent which the lap 16 is actually located. The comparator 22 compares the two sets of position data and produces a "faster" signal if the lap 16 has not reached a predicted sector or a "slower" signal if the lap 16 is ahead of a predicted sector. In response to a "faster" signal from comparator 22 the controller 27 drives the 2-speed motor 14 at a speed slightly above the particular speed used by the computer in deriving the program and in response to a "slower" signal drives the motor 14 at a speed slightly below that particular speed. The controller 27 maintains a current motor speed in the absence of a signal from the comparator 22 indicating that the

TABLE 3

| Sector No.: | Inward stroke terminations | | | | | | | | | | | Outward stroke terminations | | | |
|---|---|---|---|---|---|---|---|---|---|---|---|---|---|---|---|
| | +1 | +2 | +3 | +4 | +5 | +6 | +7 | +8 | +9 | +10 | +11 | −1 | −2 | −3 | −4 |
| I | 9 | 8 | 6 | 5 | 4 | 3 | 3 | 2 | 2 | 1 | 1 | 17 | 14 | 10 | 3 |
| II | 9 | 8 | 6 | 5 | 4 | 3 | 3 | 2 | 2 | 1 | 1 | 16 | 14 | 10 | 3 |
| III | 9 | 8 | 6 | 5 | 4 | 3 | 3 | 2 | 2 | 1 | 1 | 17 | 14 | 10 | 3 |
| IV | 9 | 8 | 6 | 5 | 4 | 3 | 3 | 2 | 2 | 1 | 1 | 17 | 14 | 10 | 3 |
| V | 9 | 8 | 6 | 5 | 4 | 3 | 3 | 2 | 2 | 1 | 1 | 17 | 14 | 10 | 3 |
| VI | 9 | 8 | 6 | 5 | 4 | 3 | 3 | 2 | 2 | 1 | 1 | 17 | 14 | 10 | 3 |
| VII | 9 | 8 | 6 | 5 | 4 | 3 | 3 | 2 | 2 | 1 | 1 | 17 | 14 | 10 | 3 |
| VIII | 9 | 8 | 6 | 5 | 4 | 3 | 3 | 2 | 2 | 1 | 1 | 16 | 14 | 10 | 3 |
| IX | 9 | 8 | 6 | 5 | 4 | 3 | 3 | 2 | 2 | 1 | 1 | 17 | 14 | 10 | 3 |
| X | 9 | 8 | 6 | 5 | 4 | 3 | 3 | 2 | 2 | 1 | 1 | 17 | 14 | 10 | 3 |
| XI | 9 | 8 | 6 | 5 | 4 | 3 | 3 | 2 | 2 | 1 | 1 | 17 | 14 | 10 | 3 |
| XII | 9 | 8 | 6 | 5 | 4 | 3 | 3 | 2 | 2 | 1 | 1 | 17 | 14 | 10 | 3 |
| XIII | 9 | 8 | 6 | 4 | 4 | 3 | 3 | 2 | 2 | 0 | 1 | 17 | 14 | 10 | 3 |
| XIV | 9 | 8 | 6 | 5 | 4 | 3 | 3 | 2 | 2 | 1 | 1 | 17 | 14 | 10 | 3 |
| XV | 9 | 8 | 6 | 5 | 4 | 3 | 3 | 2 | 2 | 1 | 1 | 17 | 14 | 10 | 3 |
| XVI | 8 | 8 | 6 | 5 | 4 | 3 | 3 | 2 | 2 | 1 | 1 | 17 | 14 | 10 | 3 |

Because the initial +4 stroke terminated at point $b$ in sector XIII, the 5 in the XIII and +4 columns of Table 2 is reduced to 4 in Table 2. Similarly, the number 17 in the VIII and −1 columns of Table 2 is reduced to number 16 in Table 3 because the second selected −1 stroke terminated at point $d$ in sector VIII. In the same manner, the number 1 is replaced by zero in the XIII and +10 position of Table 3, the number 17 reduced to 16 in the II and −1 columns, the number 9 reduced to number 8 in the XVI and +1 columns, etc. These changes continue to occur in the computer's memory bank as new stroke amplitudes are randomly selected. However, assume that after sequential selection of the +4, −1, +10, −1, +1, −4 stroke amplitudes represented schematically by the path in FIG. 6, the computer arbitrarily selects next a +10 stroke amplitude. Table I shows that a +10 stroke corresponds to 10 sectors of circumferential movement. Thus, a +10 stroke begun at the previous termination point $e$ in sector VIII would terminate in sector XIII. However, as indicated by the zero in the XIII and +10 columns of Table 3, no additional +10 strokes are available for termination in that sector. Consequently, the computer rejects that selection and selects a new stroke amplitude that is currently available. This random but two sets of position data correspond. Thus, the speed of motor 14 alternates between two values such that the average speed during a lengthy polishing operation is equal to that used by the computer in deriving the program.

Obviously, many modifications and variations of the present invention are possible in light of the above teachings. For example, control mechanisms other than the tape reader 19 can be used. Suitable mechanisms include electrical digital counters, electrical timers, digital or analog computers, etc. Also optical surface modifying mechanisms other than the optical lap 16 can be used according to the invention. Other suitable surface modifying mechanisms include, for example, ion beams, electrolytic polishing electrodes, vapor columns, etc.

What is claimed is:

1. An optical surface generating method comprising the steps of producing relative transverse movement between a surface modifying mechanism and the work surface of an optical blank, producing the relative movement in a path having both circumferential and oscillating radial components, continuously varying the amplitude of the oscillating radial component of relative transverse movement so as to generate on said work surface a desired contour change, and selecting the varying amplitudes of the radial component so as to produce direction reversals therein when said surface modifying mechanism is sequentially adjacent different predetermined sectors of said work surface.

2. An optical surface generating method according to claim 1 wherein said work surface is figuratively divided into a given number of sectors, and the varying amplitudes of the radial component are selected so as to control the number of said direction reversals that occur when said surface modifying mechanism is adjacent each of said given number of sectors.

3. An optical surface generating method according to claim 2 wherein said varying amplitudes of the radial component are selected so as to substantially equalize the number of direction reversals of given amplitudes that occur when said surface modifying mechanism is adjacent each of said given number of sectors.

4. An optical surface generating method according to claim 1 wherein the amplitude of the radial component is varied by producing direction reversals therein when said surface modifying mechanism is adjacent sequentially different radial positions on said work surface, a predetermined relative number of said direction reversals are produced when said surface modifying mechanism is adjacent each of a given number of such radial positions, and said direction reversals adjacent predetermined sectors are established by producing said direction reversals adjacent appropriate predetermined ones of said given number of said radial positions.

5. An optical surface generating method according to claim 4 wherein said work surface is figuratively divided into a given number of sectors, and the varying amplitudes of the radial component are selected so as to control the number of said direction reversals that occur when said surface modifying mechanism is adjacent each of said given number of sectors.

6. An optical surface generating method according to claim 5 wherein said varying amplitudes of the radial component are selected so as to substantially equalize in each of said sectors the number of direction reversals that occur adjacent each of said given number of said radial positions.

7. An optical surface generating method according to claim 4 wherein said circumferential component of relative movement is produced by rotating said optical blank, and said radial component of relative movement is produced by reciprocating said surface modifying mechanism.

8. An optical surface generating method according to claim 7 wherein said work surface is figuratively divided into a given number of sectors, and the varying amplitudes of the radial component are selected so as to control the number of said direction reversals that occur when said surface modifying mechanism is adjacent each of said given number of sectors.

9. An optical surface generating method according to claim 8 wherein said varying amplitudes of the radial component are selected so as to substantially equalize in each of said sectors the number of direction reversals that occur adjacent each of said given number of said radial positions.

10. An optical surface generating method according to claim 1 including the step of regulating the relative velocities of said circumferential and said radial components of relative movement so as to maintain a known relationship therebetween.

11. An optical surface generating method according to claim 10 wherein the amplitude of the radial component is varied by producing direction reversals therein when said surface modifying mechanism is adjacent sequentially different radial positions on said work surface, a predetermined relative number of said direction reversals are produced when said surface modifying mechanism is adjacent each of a given number of such radial positions, and said direction reversals adjacent predetermined sectors are established by producing said direction reversals adjacent appropriate predetermined ones of said given number of said radial positions.

12. An optical surface generating method according to claim 11 wherein said work surface is figuratively divided into a given number of sectors, and the varying amplitudes of the radial component are selected so as to control the number of said direction reversals that occur when said surface modifying mechanism is adjacent each of said given number of sectors.

13. An optical surface generating method according to claim 12 wherein said varying amplitudes of the radial component are selected so as to substantially equalize in each of said sectors the number of direction reversals that occur adjacent each of said given number of said radial positions.

14. An optical surface generating method according to claim 10 wherein said regulating step comprises the step of measuring the degree of relative circumferential movement that occurs between said surface modifying mechanism and said work surface for a given degree of relative radial movement therebetween.

15. An optical surface generating method according to claim 14 wherein the amplitude of the radial component is varied by producing direction reversals therein when said surface modifying mechanism is adjacent sequentially different radial positions on said work surface, a predetermined relative number of said direction reversals are produced when said surface modifying mechanism is adjacent each of a given number of such radial positions, and said direction reversals adjacent predetermined sectors are established by producing said direction reversals adjacent appropriate predetermined ones of said given number of said radial positions.

16. An optical surface generating method according to claim 15 wherein said work surface is figuratively divided into a given number of sectors, and the varying amplitudes of the radial component are selected so as to control the number of said direction reversals that occur when said surface modifying mechanism is adjacent each of said given number of sectors.

17. An optical surface generating method according to claim 16 wherein said varying amplitudes of the radial component are selected so as to substantially equalize in each of said sectors the number of direction reversals that occur adjacent each of said given number of said radial positions.

18. Optical surface generating apparatus comprising blank support means adapted to support an optical blank, surface modifying means adapted to alter the relative elevation of a limited area on the work surface of an optical blank supported by said blank support means, drive means adapted to produce relative transverse movement having both circumferential and oscillating radial components between said surface modifying means and the supported work surface, and automatic control means for continuously varying the amplitude of said oscillating radial component of relative movement so as to produce direction reversals therein when said surface modifying means is adjacent predetermined different sectors of the work surface.

19. Optical surface generating apparatus according to claim 18 wherein said automatic control means is adapted to vary the amplitude of the radial component so as to control the number of direction reversals therein that occur when said surface modifying mains is adjacent each of a predetermined number of sectors comprising the work surface.

20. Optical surface generating apparatus according to claim 18 wherein said drive means produces said circumferential component of relative movement by rotating the optical blank and produces said oscillating radial component of relative movement by reciprocating said surface modifying means.

21. Optical surface generating apparatus according to claim 20 wherein said automatic control means is adapted to vary the amplitude of the radial component so as to control the number of direction reversals therein that occur when said surface modifying means adjacent each of a predetermined number of sectors comprising the work surface.

22. Optical surface generating apparatus according to claim 20 wherein said control means comprises measuring means for measuring the radial position of said surface modifying means with respect to said work surface.

23. Optical surface generating apparatus according to claim 22 including regulation means for maintaining a known relationship between the velocities of said circumferential and radial components of relative movement.

24. Optical surface generating apparatus according to claim 23 wherein said automatic control means is adapted to vary the amplitude of the radial component so as to control the number of direction reversals therein that occur when said surface modifying means is adjacent each of a predetermined number of sectors comprising the work surface.

25. Optical surface generating apparatus according to claim 22 wherein said regulation means comprises sensing means for measuring the degree of relative circumferential movement that occurs between said surface modifying means and said work surface for a given degree of relative radial movement therebetween.

26. Optical surface generating apparatus according to claim 25 wherein said automatic control means is adapted to vary the amplitude of the radial component so as to control the number of direction reversals therein that occur when said surface modifying means is adjacent each of a predetermined number of sectors comprising the work surface.

References Cited
UNITED STATES PATENTS

| | | | |
|---|---|---|---|
| 1,901,236 | 3/1933 | Guild | 51—3 |
| 2,087,514 | 7/1937 | Hubbell | 51—55 |

WILLIAM R. ARMSTRONG, Primary Examiner

U.S. Cl. X.R.

51—284